United States Patent [19]
Tachikake et al.

[11] Patent Number: 5,433,016
[45] Date of Patent: Jul. 18, 1995

[54] LINEAR DISPLACEMENT MEASURING APPARATUS

[75] Inventors: Masahiko Tachikake; Akio Fujimaru, both of Kawasaki; Tetsuya Nakadoi, Higashihiroshima, all of Japan

[73] Assignee: Mitutoyo Corporation, Tokyo, Japan

[21] Appl. No.: 173,650

[22] Filed: Dec. 22, 1993

[30] Foreign Application Priority Data

Dec. 24, 1992 [JP] Japan ................................ 4-344757

[51] Int. Cl.6 .............................................. G01B 3/18
[52] U.S. Cl. ........................................ 33/820; 33/703
[58] Field of Search ................. 33/703, 705, 784, 813, 33/819, 820

[56] References Cited

U.S. PATENT DOCUMENTS

| | | | |
|---|---|---|---|
| 1,107,187 | 8/1914 | Spalding | 33/705 |
| 4,255,861 | 3/1981 | Nakata et al. | 33/820 |
| 4,377,036 | 3/1983 | Dangschat | 33/705 |
| 4,578,868 | 4/1986 | Sasaki et al. | 33/819 |
| 5,029,401 | 7/1991 | Masom | 33/705 |

*Primary Examiner*—William A. Cuchlinski, Jr.
*Assistant Examiner*—G. Bradley Bennett
*Attorney, Agent, or Firm*—Flynn, Thiel, Boutell & Tanis

[57] ABSTRACT

A linear displacement measuring apparatus in which a spindle is disposed movably forwardly and backwardly to a measuring apparatus main body, a detector for detecting a linear displacing amount of the spindle is disposed to the inside of the measuring apparatus main body and a water-proof mechanism is disposed to a liquid intruding path in communication with the detector for preventing liquid from intruding.

15 Claims, 17 Drawing Sheets

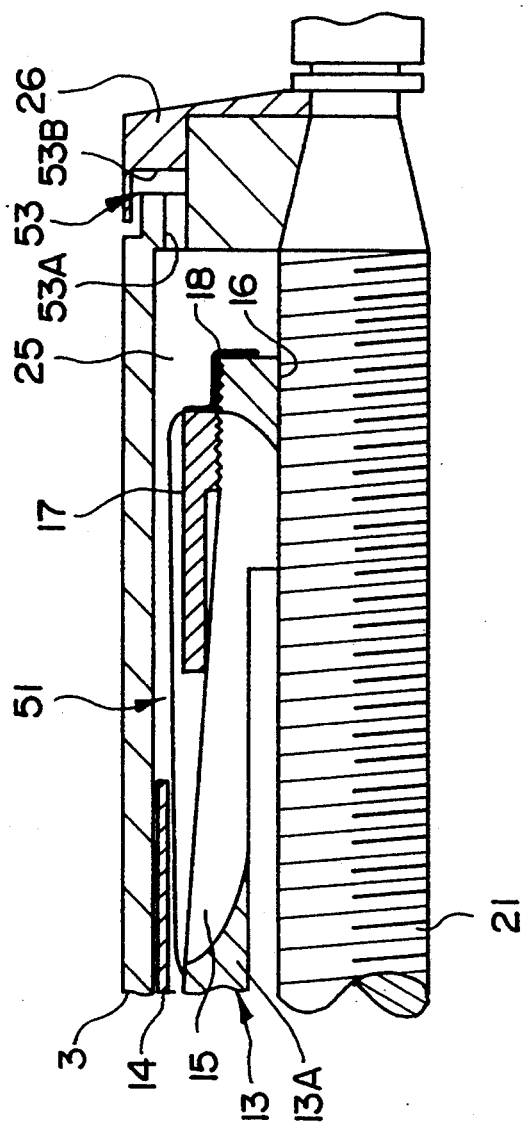

F I G. 16
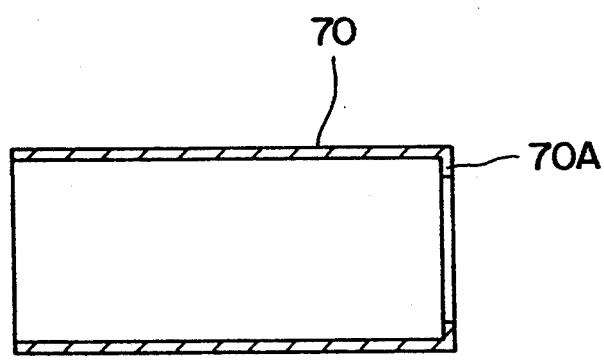

LINEAR DISPLACEMENT MEASURING APPARATUS

BACKGROUND OF THE INVENTION

1. FIELD OF THE INVENTION

The present invention concerns a linear displacement measuring apparatus such as a micrometer for use in measurement of a dimension or a shape of an object to be measured and, more in particular, it relates to an electronic linear displacement measuring apparatus for obtaining a moving amount of a spindle as an electric measurement value by a detector.

2. DESCRIPTION OF THE RELATED ART

An existent micrometer for use in measurement of a size or a shape of an object to be measured has, for example, such structure as detecting a moving amount of a spindle movably held to a measuring apparatus main body by an encoder. Such an encoder includes, for example, an optoelectronic type encoder having a main optical lattice disposed to a rotary plate and an index optical lattice disposed to a fixed plate respectively for optically detecting relative rotational displacement between both of the plates, as well as encoders using an electromagnetic, capacitance or contact type displacement detecting device. Measured signals obtained by the encoder are processed by a processing device for measured signals disposed to the inside of a micrometer and displayed in a digitized form on a digital display section or transmitted as transmission signals to an external equipment.

FIG. 17 and FIG. 18 show an existent micrometer. In FIG. 17, the existent micrometer has an anvil 2 fixed at one end of a frame 1 generally in a U-shaped configuration and a spindle 4 held at the other end of the frame 1. A clamp 7 for fixing the spindle 4 to a predetermined position is disposed to the frame 1.

FIG. 18 shows a structure for holding the spindle 4. In FIG. 18, the spindle 4 comprises a spindle main body 4A in contact, at one end thereof, with an object to be measured and a screw shaft 21 secured at one end to the other end of the spindle main body 4A. The spindle main body 4A is supported by way of a shaft bearing cylinder 11 to the frame 1. The screw shaft 21 is screw-coupled at the other end with an inner sleeve 13 having a plurality of recesses 15. An outer sleeve 14 is disposed to the outer circumference of the inner sleeve 13, and the sleeves 13 and 14 are secured by way of a holding ring 12 to the frame 1. The inner sleeve 13 comprises a sleeve main body 13A and a tapered nut 17 screw-coupled with the sleeve main body 13A.

A thimble 3 is secured to the other end of the screw shaft 21, and a rotational operation made to the thimble 3 causes the spindle 4 to move forwardly and backwardly relative to the anvil 2, so that measurement is conducted by means of a main scale 23 and a sub-scale 24 in a state of gripping an object to be measured. A ratchet 22 is disposed for gripping the object to be measured at a constant pressure.

In the existent electronic micrometer, a moving amount of the spindle 4 is converted into electric measured signals by an encoder 41 having a fixed plate 42 fixed to the holding ring 12 and a rotary plate 43 fixed to the spindle 4, the measured signals are processed by a not illustrated processing device having an electric circuit and displayed on a digital display section 5 or transmitted to other signal processing sections.

However, when an existent micrometer is used in such a working circumstance that liquids such as grinding liquids or grinding oils are always scattering around, it results in a problem that the liquid intrudes to the inside of the micrometer, by which a processing device at the inside causes erroneous operation.

Namely, as shown in FIG. 18, liquid intruding paths, for example, paths a1, a2 and b through which the liquid intrudes from the outside to the inside are present in the micrometer.

The path a1 is present at a boundary between the outer sleeve 14 and the thimble 3. The liquid intrudes through the boundary between the outer sleeve 14 and the thimble 3, creeps along a small gap 19 between the outer circumferential surface of the outer sleeve 14 and the inner circumferential surface of the thimble 3 and then reaches the outer circumferential surface of the screw shaft 21 through the recesses 15 of the inner sleeve 13 as shown by the path a2. Since the screw shaft 21 is formed integrally with the spindle main body 4a, the intruding liquid creeps along the screw shaft 21 and reaches the encoder 41 and the processing device attached to the spindle main body 4A.

The path b is present at a boundary between the spindle main body 4A and the shaft bearing cylinder 11. The liquid intrudes from the path b, further, intrudes through a boundary 34 between a cylindrical member 31 disposed in adjacent with the shaft bearing cylinder 11 and the spindle main body 4A to the inside of the micrometer and reaches the encoder 41 or the processing device.

A chamber 25 is formed to the inside of the thimble 3, and the volume of the chamber 25 changes greatly by rotating to axially move the thimble 3. If the volume change occurs abruptly, a difference may be caused between an external atmospheric pressure and a pressure in the chamber 15 and between the pressure in the chamber 25 and a pressure at the inside of the micrometer in which the processing device is contained.

For instance, if the external atmospheric pressure is higher than that in the chamber 25, the liquid at the outside intrudes passing through the path a1 into the chamber 25. If the pressure in the chamber 25 is higher than the pressure in the micrometer, the liquid intruding into the chamber 25 creeps from the path a2 and along the screw shaft 21 and then reaches the encoder 41 and the processing device disposed to the inside. That is, a sort of pumping action is given by the chamber 25.

Therefore, in the existent micrometer, the liquid may some time intrude through the liquid intruding paths a1, a2, b to a detector such as a processing device comprising electric circuits, which makes measurement impossible or causes measuring errors.

It is, accordingly, an object of the present invention to provide a water proof linear displacement measuring apparatus capable of preventing a liquid from intruding into a detector disposed to the inside of a measuring apparatus main body thereby eliminating measurement failure caused by the liquid.

SUMMARY OF THE INVENTION

The foregoing object can be attained in accordance with the present invention by a linear displacement measuring apparatus in which a spindle is disposed retractably to a measuring apparatus main body and a detector for detecting a linear moving amount of the spindle is disposed to the inside of the measuring apparatus main body, wherein a water proof mechanism is disposed to a liquid intruding paths leading to the detector for preventing intrusion of a liquid such as water or oil.

The spindle may comprise a spindle main body in contact, at one end thereof, with an object to be measured and a screw shaft secured to the other end of the spindle main body.

The measuring apparatus main body may have a structure comprising a frame having a communication channel for communicating the inside and the outside of the measuring apparatus main body, a lid member for closing the communication channel, a sleeve having one end secured to the frame and the other end in which a recess leading to the detector is formed and a thimble covering the screw shaft.

Further, the sleeve may have a structure comprising a sleeve main body and a clamping member for clamping the sleeve main body.

Then, a covering means is disposed as a first means of the waterproof mechanism and the covering means has a structure for closing the sleeve in a sealed state. In the structure, the recess of the sleeve is covered with a tube member made of a thermosetting shrinkable material or elastic material. A spacer such as a sealing tape may be interposed between the sleeve main body and the clamping member for preventing the liquid from intruding into a space between the screw shaft and the sleeve.

Further, both ends of the tube member and the sleeve may be bonded intimately by adhesion means such as adhesives, resilient rings or resilient sealers.

Further, as a second means of the waterproof mechanism, a sealing means may be disposed to be in contact with the spindle main body and disposed to the measuring apparatus main body, and the sealing means may be constituted, for example, with O-rings.

Further, as a third means of the waterproof mechanism, a pressure control means is disposed for controlling a pressure in a space between the screw shaft and the thimble to an external atmospheric pressure and the means can be constituted with at least one opening formed to the thimble. In the openings, the center lines for the openings may be in parallel with the axial direction of the thimble and the opening ends oppose to corners of the chamber defined by a space between the screw shaft and the thimble.

A liquid such as a cutting oil tends to intrude along the liquid intrusion paths into the detector but intrusion to the detector is inhibited by the water proof mechanism.

For instance, when a sleeve disposed around the screw shaft of the spindle is closed with the covering means in a sealed state, the liquid can be inhibited from passing through the recesses of the sleeve and, further, intruding into the inside along the screw shaft of the spindle.

Further, when the sealing means is disposed to the measuring apparatus main body, the liquid passing through the space between the measuring apparatus main body and the spindle main body can be inhibited from intruding into the measuring apparatus main body.

Further, when the opening or the like is formed to the thimble, the pressure in the space between the thimble and the screw shaft can be controlled to the external atmospheric pressure, which can eliminate a pumping action sucking of the liquid into the space or delivery of the liquid from the space to the inside of the measuring apparatus main body, so that the liquid can be prevented from intruding into the measuring apparatus main body.

BRIEF DESCRIPTION OF THE DRAWINGS

FIG. 2 is a fragmentary cross sectional view of the first embodiment;

FIG. 16 is a cross sectional view illustrating a different embodiment of a tube member in the forth embodiment.

DETAILED DESCRIPTION OF THE PREFERRED EMBODIMENT(S)

Description will now be made more in details to preferred embodiments according to the present invention with reference to the accompanying drawings.

Figure 1:
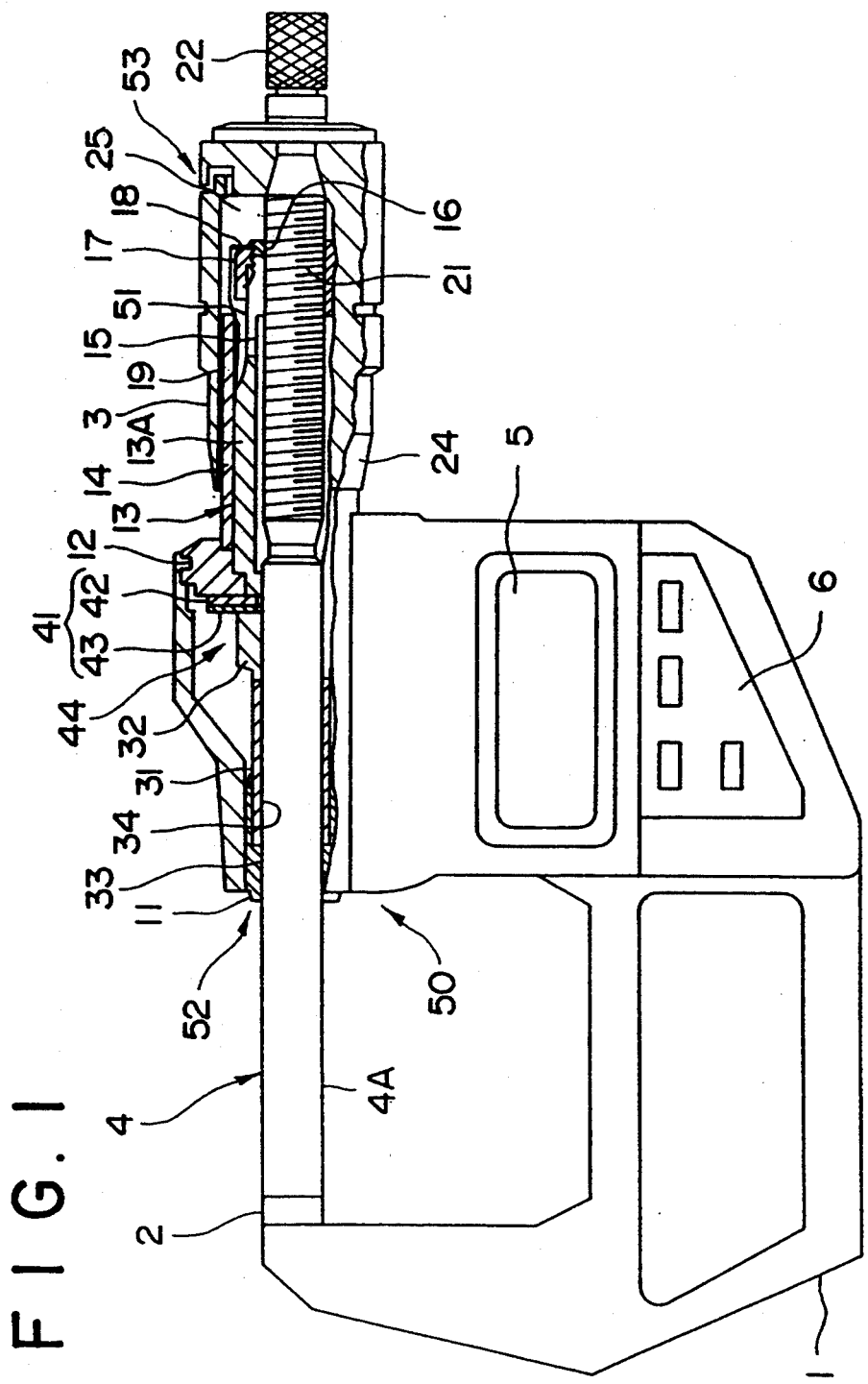
FIG. 1 is a view partially in cross section of a linear displacement measuring apparatus of a first embodiment according to the present invention.

FIG. 1 is a front elevational view partially in cross section of a linear displacement measuring apparatus in a first embodiment according to the present invention.

Figure 17:
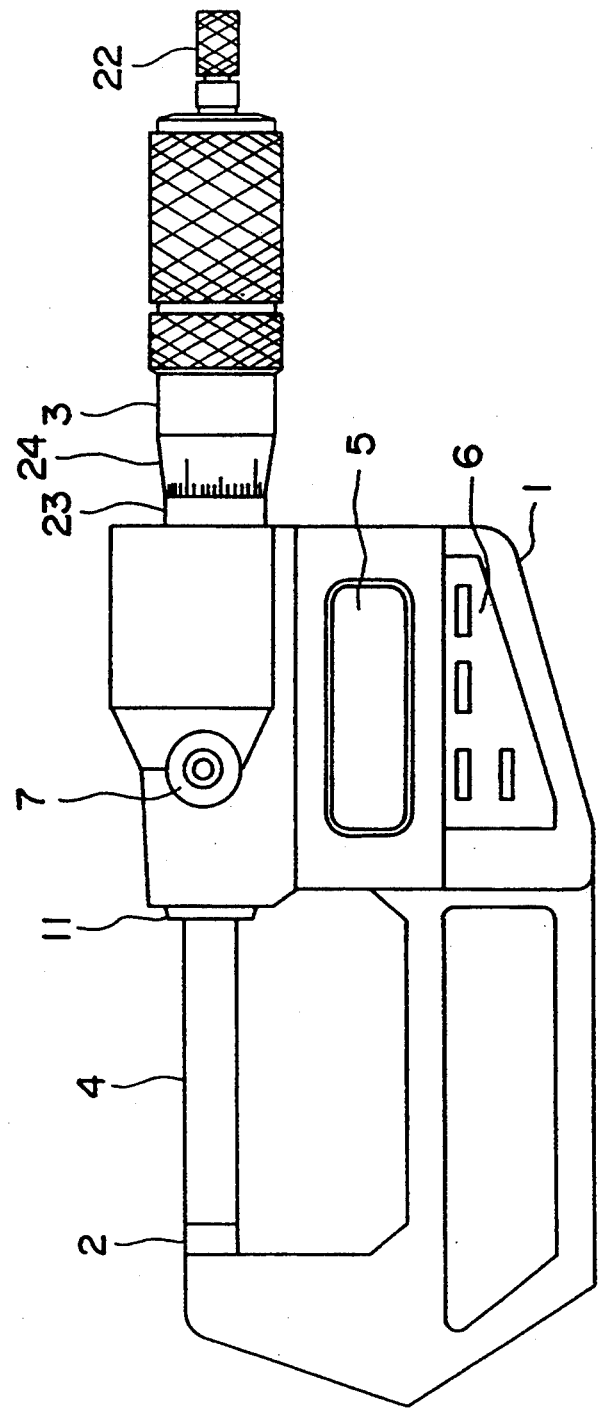
FIG. 17 is a front elevational view of a linear displacement measuring apparatus in the prior art.
Figure 18:
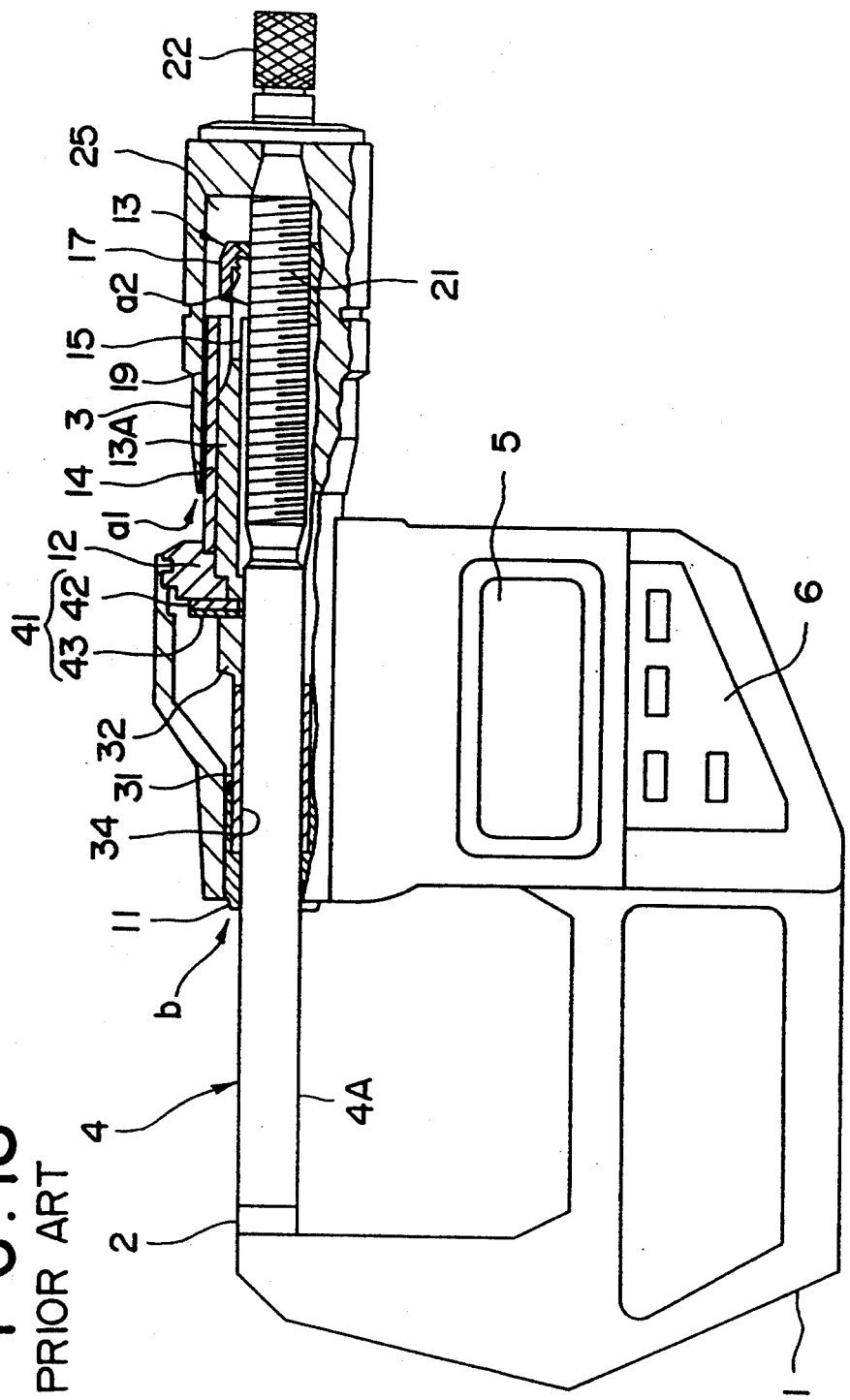
FIG. 18 is a fragmentary cross sectional view of a linear displacement measuring apparatus in the prior art.

In FIG. 1, those parts or portions carrying same reference numerals as those of the existent measuring apparatus shown in FIG. 17 and FIG. 18 represent identical parts or portions, for which descriptions will be omitted or simplified.

The linear displacement measuring apparatus of the first embodiment is a micrometer which has basically the same structure as the micrometer shown in FIG. 17 and FIG. 18.

That is, the micrometer of the first embodiment has an anvil 2 secured at one end and a spindle 4 held at the other end of a substantially U-shaped frame 1 formed with an inside cavity, in which the spindle 4 is caused to move forwardly and backwardly relative to the anvil 2 by a rotating operation to the thimble 3 disposed to the spindle 4. The spindle 4 has a ratchet 22 for gripping an object to be measured at a constant pressure. The frame 1 has a digital display section 5 for digital display of measured values and an operation section 8 for switching of display units, pre-setting and switching of modes disposed to the outer circumferential surface thereof.

The spindle 4 has a spindle main body 4A and a screw shaft 21, and the spindle main body 4A is supported by way of a shaft bearing cylinder 11 to the frame 1. A holding ring 12 is secured to the frame 1, and an inner sleeve 13 and an outer sleeve 14 are held on one end in a dual ring structure to a central portion of the holding ring 12. The inner sleeve 13 has female threads 13 engraved along the inner circumferential surface on the other end of the inner sleeve 13, which is assembled so as to be screw-coupled with the screw shaft 21. The inner sleeve 13 has a structure comprising a sleeve main body 13A having male threads 18 formed along the outer circumference and a tapered nut 17 which is screw-coupled with the female threads 18. Three or more recesses 15 are axially formed near the end of the inner sleeve 13 in which the threads are formed. The tapered nut 17 is a clamping member for adjustment of fitting between the spindle 4 and the female threads 16 of the sleeve main body 13A. That is, when the tapered nut 17 is rotated to move axially forwardly and backwardly, an abutting position between the top end of the tapered nut 17 and the inclined surface of the sleeve main body 13A is changed.

By changing the abutting position, the inner diameter at the end of the sleeve main body 13A changes, and fitting between the screw shaft 21 and the inner sleeve 13 can be adjusted by utilizing the change of the diameter.

A rotary plate 43 is attached to the spindle main body 4A, while a fixed plate 42 is attached to the inner sleeve 13 and the rotary plate 43 and the fixed plate 42 constitute an encoder 41. The encoder 41 detects a relative rotational moving amount between the rotary plate 43 and the fixed plate 42 by means of electromagnetic, optical, capacitive or contact-fashioned conversion means, and a signal corresponding to the relative rotational angle is processed in a processing device having an electric circuit. In this first embodiment, the processing device and the encoder 41 constitute a detector 44, while frame 1, anvil 2, thimble 3, digital display section 5, operation section 6, shaft bearing cylinder 11, holding ring 12, inner sleeve 13, outer sleeve 14 and ratchet 22 constitute a measuring apparatus main body 50.

Description will then be made to a water-proof mechanism in the first embodiment.

A first water-proof mechanism is a covering means depicted by 51 in FIG. 1, a second water-proof mechanism is a sealing means depicted by 52 in FIG. 1 and a third water-proof mechanism is a pressure control means depicted by 53 in FIG. 1. Description will now be made referring to FIG. 2 through FIG. 6 successively.

At first, description will be made to the covering means 51 as the first water-proof mechanism.

Figure 3A:
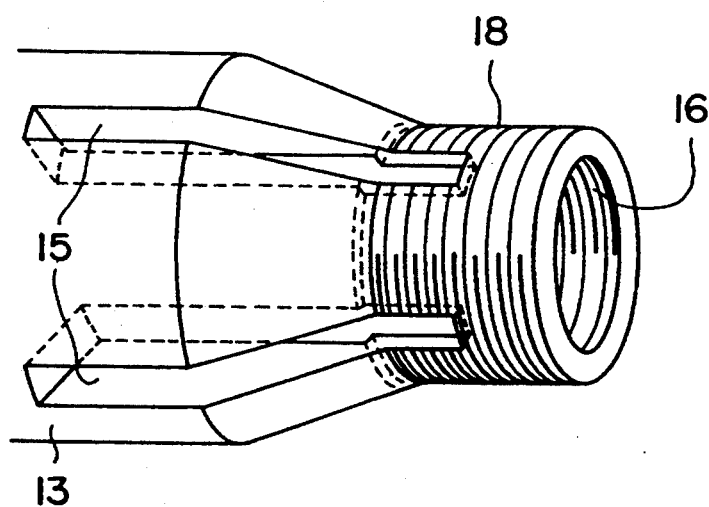
FIG. 3(A) is a perspective view illustrating an appearance of a sleeve and FIG. 3(B) is a perspective view illustrating a state in which a covering means is disposed to the sleeve.
Figure 3B:
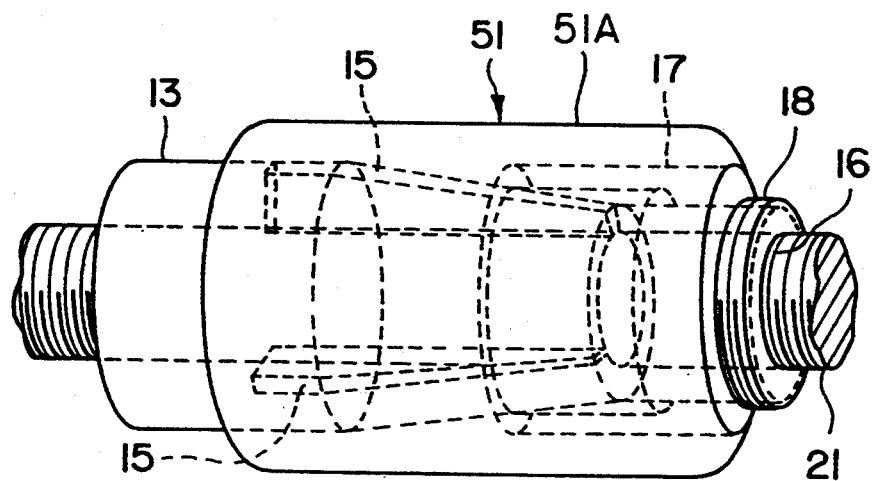

FIG. 2 is a fragmentary cross sectional view of the first embodiment, in which FIG. 3(A) shows an appearance of the inner sleeve and FIG. 3(B) shows an appearance of the inner sleeve provided with the covering means 51.

In FIG. 2, FIG. 3(A) and FIG. 3(B), the inner sleeve 13 has a tapered portion at the other end, in which recesses 15 are formed being extended over the tapered portion, as well as large and small diameter portions on both sides thereof. Since a liquid intrudes through the recesses 15, the covering means 51 is disposed to the inner sleeve 13 for preventing intrusion.

The covering means 51 is a water-proofing and oil resistant tubular member covering the recesses 15 of the sleeve main body 13A, the male threads 18 and the tapered nut 17.

A thermosetting shrinkable material such as polyolefin, PVC or polyvinyl fluoride can be used for the tube member 51A as the covering means. The tube member 51A is attached by adjusting the position to the tapered nut 17 and the sleeve main body 13 thereby setting the degree of fitting, then attaching the tube member 51A such that the tubular member 51A covers sleeve main body 13A, as well as the recesses 15 and the male threads 18 and the tapered nut 17 and, subsequently, shrinking the same under heating for close adhesion.

Covering for the male threads 18 may be saved depending on the case by the effect of a pressure control means 53 to be described later. Former, when it is necessary for readjustment with lapse of time the covering member may be removed by a knife or the like and replaced with new one after readjustment.

Description will be made to the sealing means 52 as the second water-proof mechanism.

Figure 4:
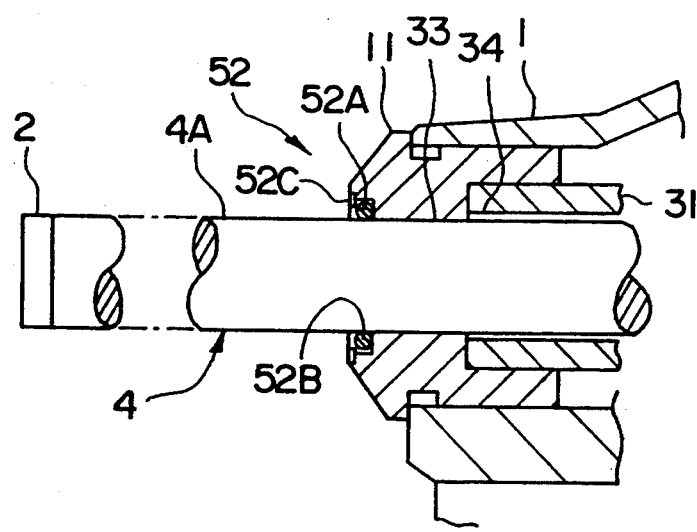
FIG. 4 is a cross sectional view of a sealing means disposed between a spindle main body and a measuring apparatus main body.
Figure 5:
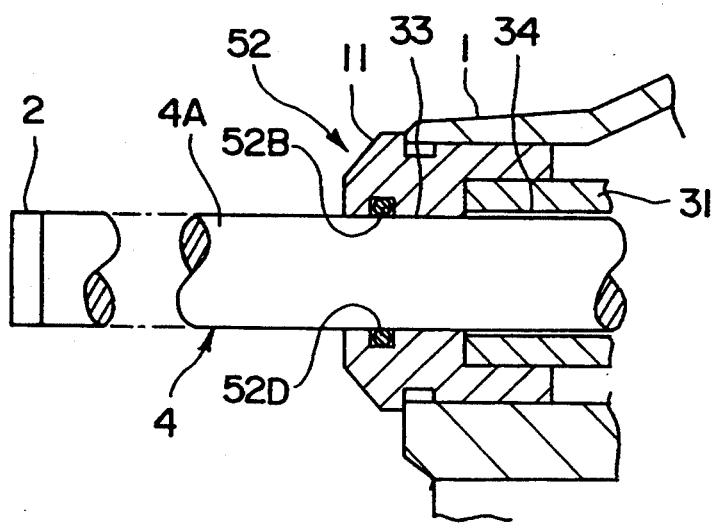
FIG. 5 is a cross sectional view of a different embodiment of a sealing means disposed between the spindle main body and the measuring apparatus main body.
Figure 6:
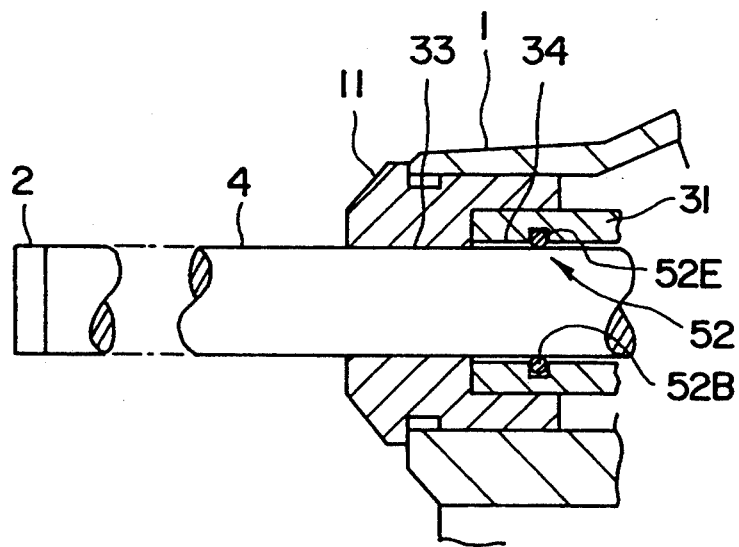
FIG. 6 is a cross sectional view for a further different embodiment of a sealing means disposed between the spindle main body and the measuring apparatus main body.

FIG. 4 is a cross sectional view for the sealing means 52, FIG. 5 is a cross sectional view for a different embodiment of the sealing means 52 and FIG. 6 is a cross sectional view for a further different example of the sealing means 52.

As shown in FIG. 4, the sealing means 52 has an annular recessed groove 52A formed in a portion at the top end of the shaft bearing cylinder 11 in contact with the spindle 4 and an annular sealing member 52B mounted to the inside of the groove 52A. Intrusion of a liquid through the gap between the spindle 4 and the shaft bearing cylinder 11 can be prevented by the sealing member 52B. As the sealing member 52B an O-ring can be used for instance.

In order to retain the sealing member 52B more reliably to the groove 52A, a holding portion 52C protruding to the groove 52A may be formed at the top end of the shaft receiving cylinder 21.

As shown in FIG. 5, a different embodiment of the sealing means has an annular recessed groove 52D formed to a portion in contact with the spindle 4 at a position inward of the top end of the shaft bearing cylinder 11 and a sealing member 52B mounted in the groove 52D. The sealing member 52B can prevent the intrusion of the liquid through the gap between the spindle 4 and the shaft bearing cylinder 11 in the same way as in the embodiment shown in FIG. 4.

As shown in FIG. 6, a further different embodiment of the sealing means 52 has an annular recessed groove 52E formed to a portion of a cylindrical member 31 disposed in adjacent with the shaft receiving cylinder 11 in contact with the spindle 4 and a sealing member 52B mounted in the groove 52E. Intrusion of the liquid through the gap between the spindle 4 and the shaft bearing cylinder 11 can be prevented by the sealing member 52B in the same way as in the embodiment shown in FIG. 4 and FIG. 5.

Description will now be made to the pressure control means 53 with reference to FIG. 2.

A collar 26 is disposed to the thimble 3. An opening 53A is formed to the inside of the thimble 3, and an opening 53B in communication with the opening 53A is formed between the thimble 3 and the collar 26. The openings 53A and 53B constitute the pressure control means 53. The pressure control means 53 is a communication channel for communicating the chamber 25 surrounded by the thimble 3 with an atmospheric air, by which the pressure in the chamber 25 can be made equal with the atmospheric pressure. When the pressure in the chamber 25 is made equal with the atmospheric pressure, no pump action is taken place even when the volume change occurs in the chamber 25 by the axial movement of the thimble 3, so that intrusion of the liquid into the measuring apparatus main body 50 can be prevented. This controls the pressure in the chamber 25 and can prevent the intrusion of the liquid even if the male threads 18 are not covered with the tube member 51. Also in a case where the liquid intrudes passing through the pressure control means 53 into the chamber 25, intrusion of the liquid to the inside of the measuring apparatus main body 50 can be prevented by the tube member 51.

Accordingly, in the first embodiment, since the inner sleeve 13 is covered in a sealed state by the tube member 51 as the covering means, the liquid can be prevented from intruding into the measuring apparatus main body 50 passing through the recesses 15 formed in the inner sleeve 13.

Further, the sealing means 52 can prevent the intrusion of the liquid to the inside of the measuring apparatus main body 50 that occurs through the boundary between the shaft bearing cylinder 11 and the spindle main body 4A.

Further, the pressure control means 53 comprising the openings 53A and 53B of the thimble 3 covering the screw shaft 21 of the spindle 4 can prevent the liquid from intruding to the inside of the measuring apparatus main body 50 caused by tile suction or delivery of the liquid, which would otherwise result in a pressure difference.

Accordingly, by preventing the intrusion of the liquid into the measuring apparatus main body 50, erroneous operation of the detector 14 such as tile processing device, which makes measurement impossible or causes measuring errors, can be prevented by preventing the intrusion of the liquid to the inside of the measuring apparatus main body 50.

Description will now be made to the second embodiment according to the present invention with reference to FIG. 7 through FIG. 12. In the second embodiment, same or similar constituent parts or portions as those in the first embodiment carry the same reference numerals, for which explanation will be omitted or simplified.

The second embodiment is basically identical to the first embodiment except for the difference with respect to the water-proof mechanism as compared with the first embodiment.

Figure 7:
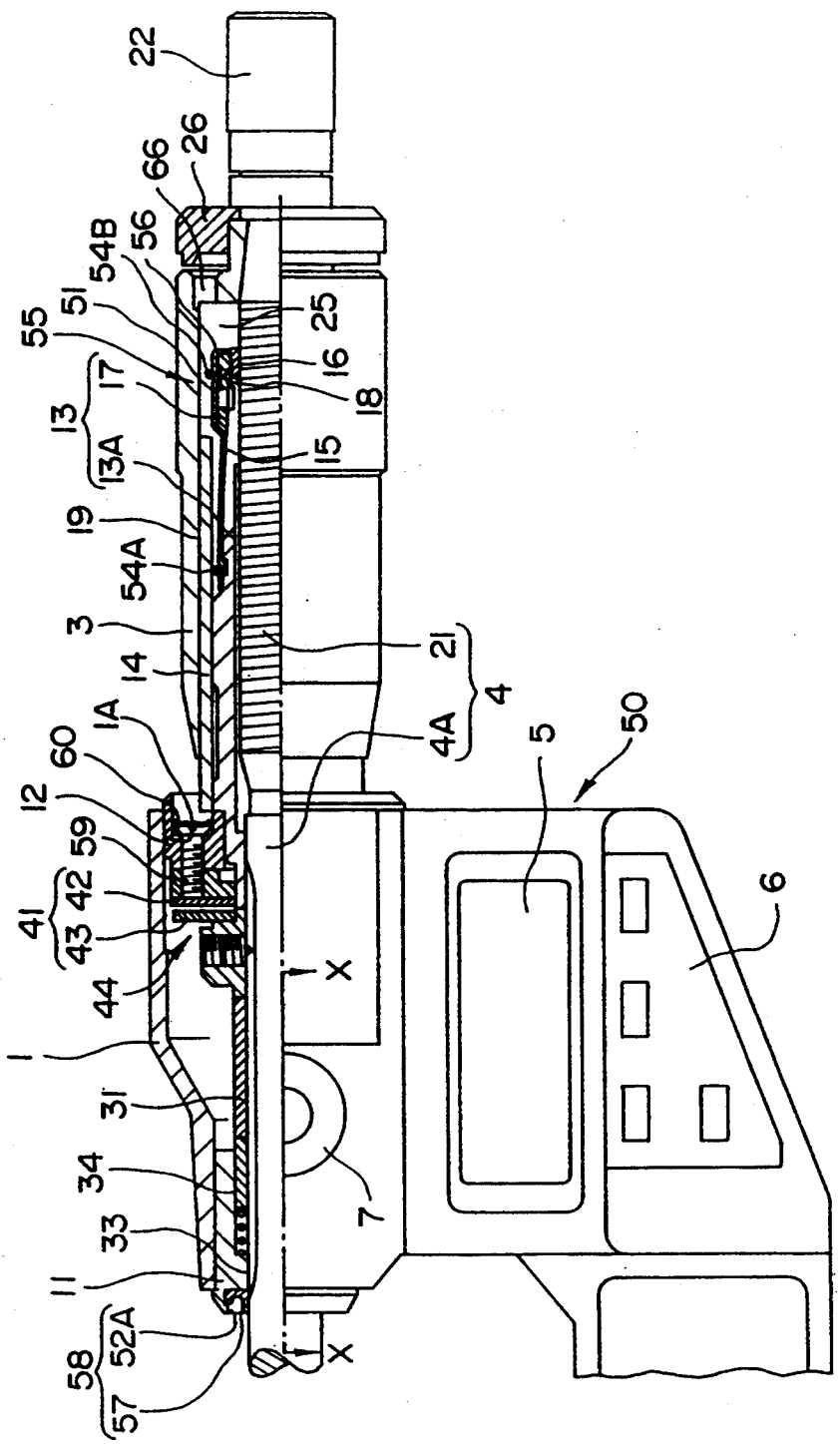
FIG. 7 is a cross sectional view of a linear displacement measuring apparatus of a second embodiment according to the present invention.

In FIG. 7 illustrating a principal portion of the second embodiment, a first water-proof mechanism is disposed to the inner sleeve 13, a second water-proof mechanism is disposed to each of the shaft bearing cylinder 11 and the holding ring 12, respectively, and a third water-proof mechanism is disposed to the thimble 3.

Figure 8:
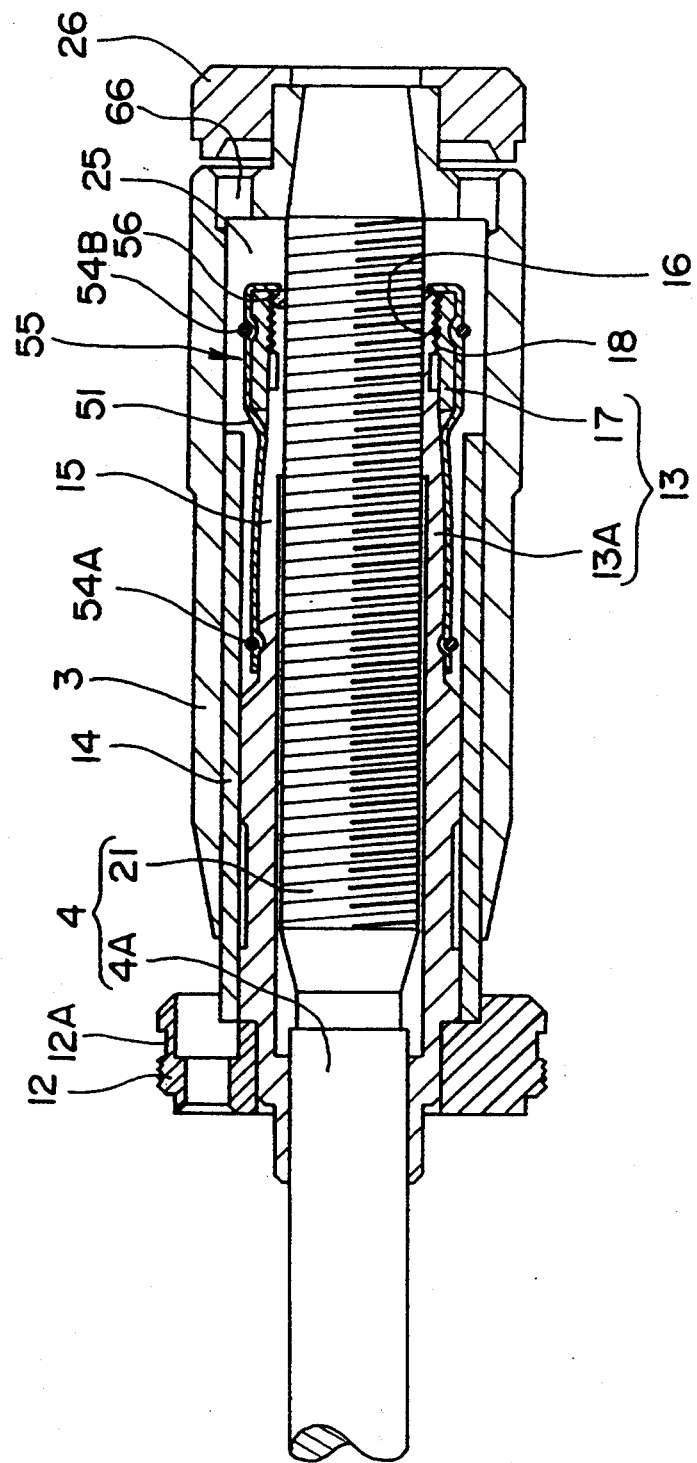
FIG. 8 is a fragmentary cross sectional view of a linear displacement measuring apparatus of a second embodiment.

As shown in FIG. 8, the first water-proof mechanism is a covering means 55 comprising the tube member 51, an elastic ring 54A as a close bonding means for intimately bonding one end of the tube member 51 and the sleeve main body 13A, and an elastic ring 54B as close bonding means for intimately bonding the other end of the tube member 51 and the tapered nut 17. The elastic rings 54A, 54B press the outer circumference on both ends of the tube member 51 against the sleeve 13 comprising the sleeve main body 13A and the tapered nut 17.

A sealing tape 56 is interposed as a spacer between male threads 18 and the tapered nut 17 of the sleeve main body 13A. The sealing tape 56 is a water-proof and oil resistant tape made of a SUMIFRON NEJI SEAL (trade name of products manufactured by Sumitomo Electric Industry Co.) or the like, which prevents intrusion of a liquid between the screw shaft 21 and the inner sleeve 13. FIG. 7 shows a second water-proof mechanism disposed to the shaft bearing cylinder 11. As shown in FIG. 7, the second water-proof mechanism is a sealing means 58 comprising a groove 52A formed to a shaft bearing cylinder 11 and an annular sealing member 57 mounted in the groove 52A. The sealing member 58 has a U-shaped configuration opened outward for improving the water-proof effect.

Figure 9:
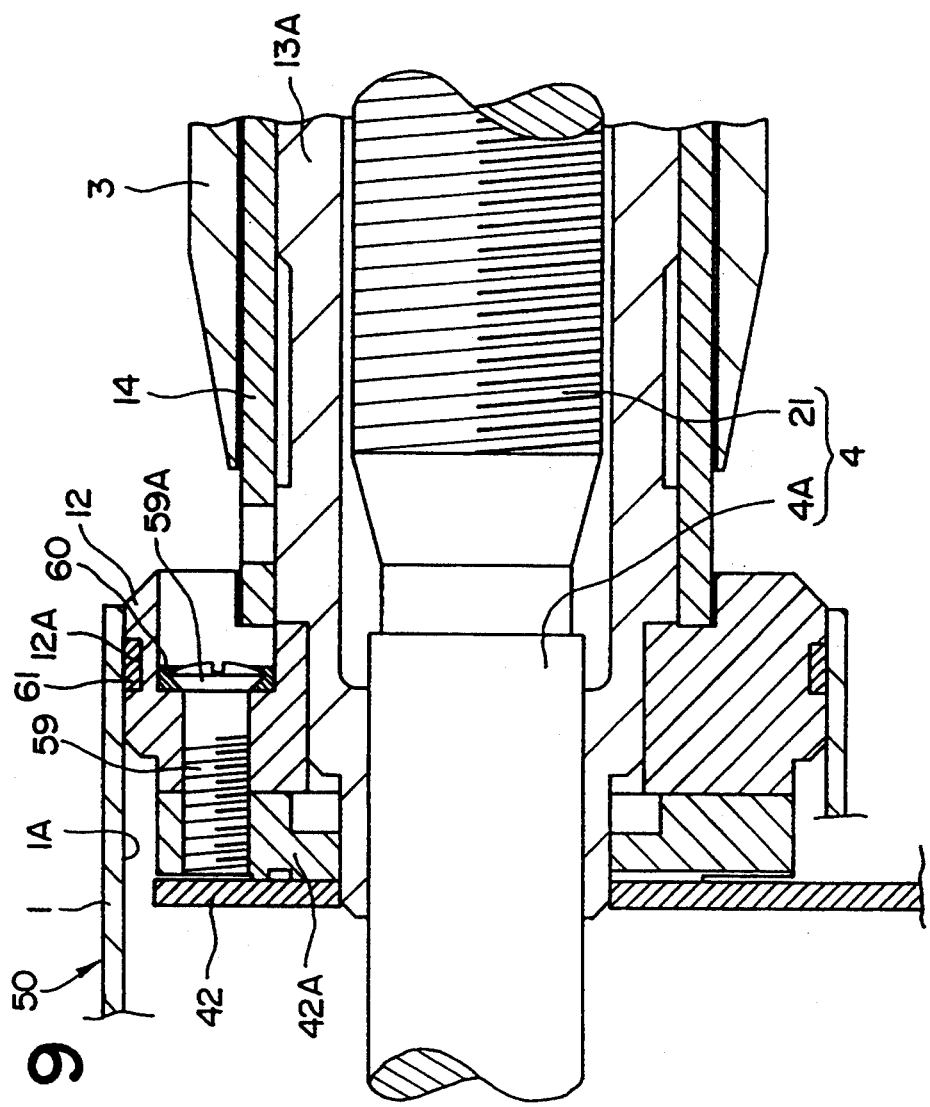
FIG. 9 is a fragmentary cross sectional view of a linear displacement measuring apparatus of a second embodiment.

FIG. 9 shows a second water-proof mechanism disposed to a holding ring 12. As shown in FIG. 9, a communication channel 1A is formed to the frame 1 for communicating the inside and the outside of the measuring apparatus main body 50, and the communication channel 1A is closed by the holding ring 12. The holding ring 12 functions as a lid member and it is attached by means of a screw member 59 to an attachment 42A for attaching the fixed plate 42. The screw member 59 has a flange 59A and a sealing member 60 is disposed as a sealing means between the flange 59A and the holding ring 12. When the screw member 59 is screwed completely into the holding ring 12, the sealing member 60 is crushed between the holding ring 12 and the flange 59A to provide a sealing effect.

A recess 12A is formed to the outer circumference of the holding ring 12 and a sealing member 61 is disposed as a sealing means between the recess 12A and the frame 1. Incidentally, the arrangement of the holding ring 12 in the communication channel 1A may be obtained by a combination with the screw member 59 and the sealant as the sealing member 61.

Figure 10:
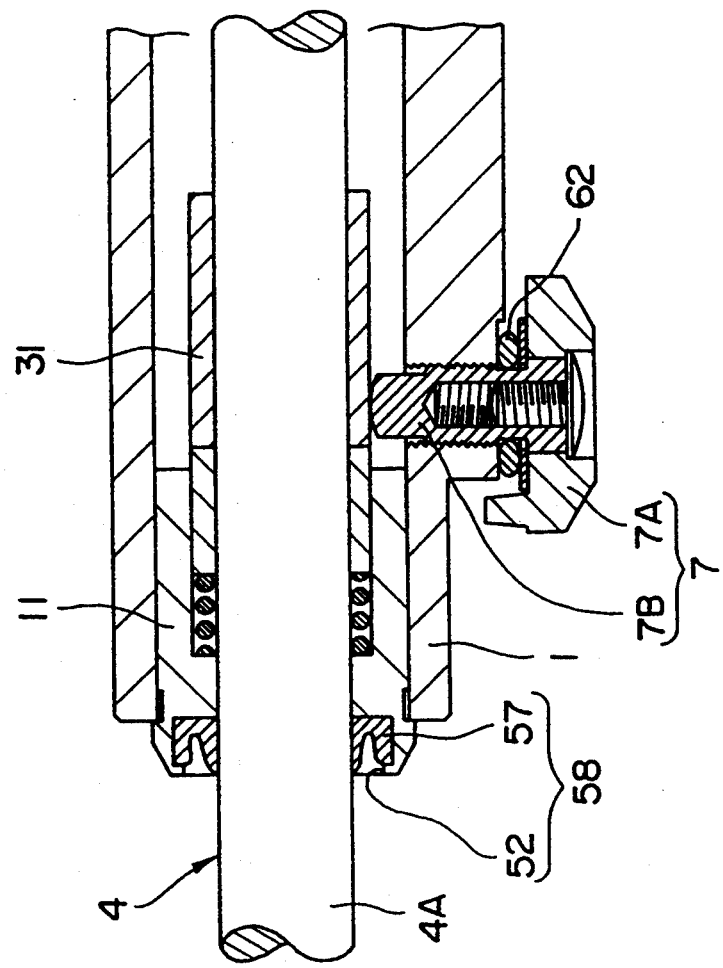
FIG. 10 is a cross sectional view taken along lines X—X in FIG. 7.

FIG. 10 shows a sealing means as a second water-proof mechanism disposed to a clamp 7. As shown in FIG. 10, the clamp 7 comprises a threaded portion 7B which is screw-coupled with the frame 1 and a knob portion 7A secured to the threaded portion 7B. A sealing member 62 is interposed as a sealing means between the knob portion 7A and the frame 1.

Figure 11:
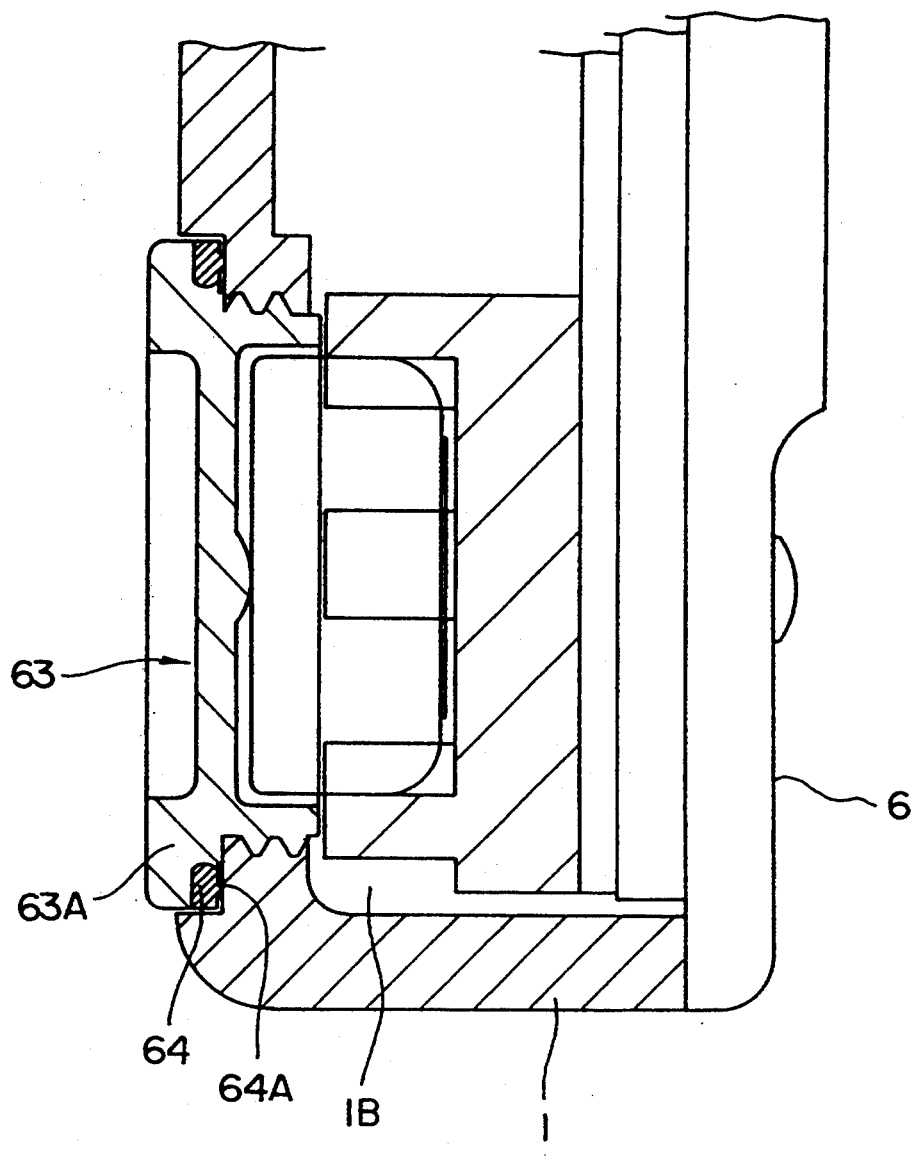
FIG. 11 is a cross sectional view illustrating a mounting structure for a frame and a lid member in the second embodiment.

FIG. 11 shows a sealing means as a second water-proof mechanism disposed at the back of an operation section 6 in the frame 1. In FIG. 11, an electric cell containing space 1B is formed in the frame 1. The cell containing space 1B forms a communication channel for communicating the inside and the outside of the measuring apparatus main body 50. A lid 63 is disposed to the frame 1 for closing the cell containing space 1B, and the lid member 63 has a flange 63A. A sealing member 64 as a sealing means is disposed between the flange 63A and the frame 1. The sealing member 64 is disposed in a ring-like shape at a portion of the flange 63A facing the frame 1, and a protrusion 64A is formed at a portion in contact with the frame 1.

Figure 12:
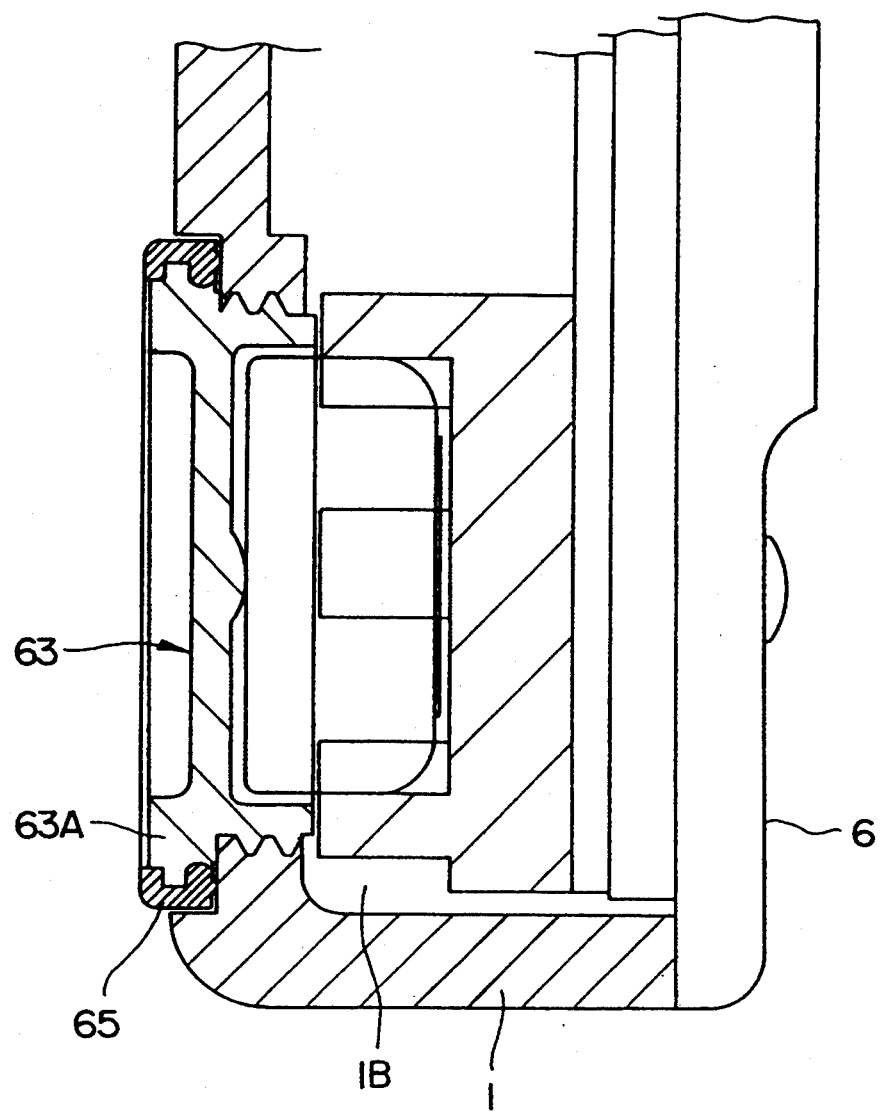
FIG. 12 is a cross sectional view illustrating another embodiment of a mounting structure for a frame and a lid member in the second embodiment.

FIG. 12 shows another embodiment of the second water-proof mechanism disposed at the back of the operation portion 6 in the frame 1. In FIG. 12, a sealing member 65 as a sealing means is disposed between the frame 1 and a lid member 63, and the sealing member 65 is formed in a ring-like shape so as to cover the outer circumference of the flange 63A. Instead of the sealing member 64 and 65, O-rings may be interposed between the frame 1 and the flange 63A.

As shown in FIG. 8, the third water-proof mechanism disposed to the thimble 3 is a pressure control means 66. The pressure control means 66 comprises a plurality of openings disposed to the thimble 3, in which the center line for the opening is in parallel with the axial direction of the thimble 3 and faces a corner of the chamber 25.

The second embodiment having the constitution described above can provide a more excellent effect than the first embodiment.

Since the tube member 5i is made of a thermosetting shrinkable member of insufficient elasticity, intimate bonding between the tube member 51 and the inner sleeve 13 is not complete and a slight gap may possibly be caused between them. In addition, the tube member 51 made of the thermosetting shrinkable material may sometimes be swollen upon contact with the liquid such as cutting oils to make the gap larger. However, in this second embodiment, since the covering means 55 comprise the tube member 51 and retaining rings 54A and 54B for securing the inner sleeve 13 on both ends of the tube member 51, intrusion of liquid between the screw shaft 21 and the inner sleeve 13 can be prevented more effectively.

Further in a case if a gap is present at a meshing portion between the male threads 18 of the sleeve main body 13A and the tapered nut 17, the liquid may possibly intrude through the gap into a portion between the screw shaft 21 and the inner sleeve 13. In this second embodiment, however, since the sealing tape 56 is interposed between the tapered nut 17 and the sleeve main body 13A, the liquid can prevented from intruding through the gap into a portion between the screw shaft 21 and the inner sleeve 13.

Further, in the second embodiment, since the sealing members 60 and 61 are disposed to the holding ring 12, the sealing member 62 is disposed between the frame 1 and clamp and the sealing member 54 is disposed between the frame 1 and the lid member 63, in addition to the sealing member 58 disposed to the shaft bearing cylinder 11, the liquid can be prevented from intruding to the inside of the measuring apparatus main body 50 more reliably.

Further, in the second embodiment, since the pressure control means 66 comprises the opening formed in the thimble 3, the center line for the opening is made in parallel with the axial line of the thimble 3 and the opening end faces the corner of the chamber 25, liquid or dust intruding to the inside of the thimble 3 can be kept from stagnating at the corner of the chamber 25, so that the liquid or the like can be drained easily to the out-side thereby preventing rusting or clogging.

In the second embodiment, time tube member 51 and the inner sleeve 13 may be secured by means of epoxy adhesives. Further, water-proof adhesives may be used as the sealing means instead of the sealing members 60, 61 disposed to the holding ring 12. Further, the spacer interposed between the sleeve main body 13A and the tapered nut 17 may also be composed of adhesives.

Figure 13:
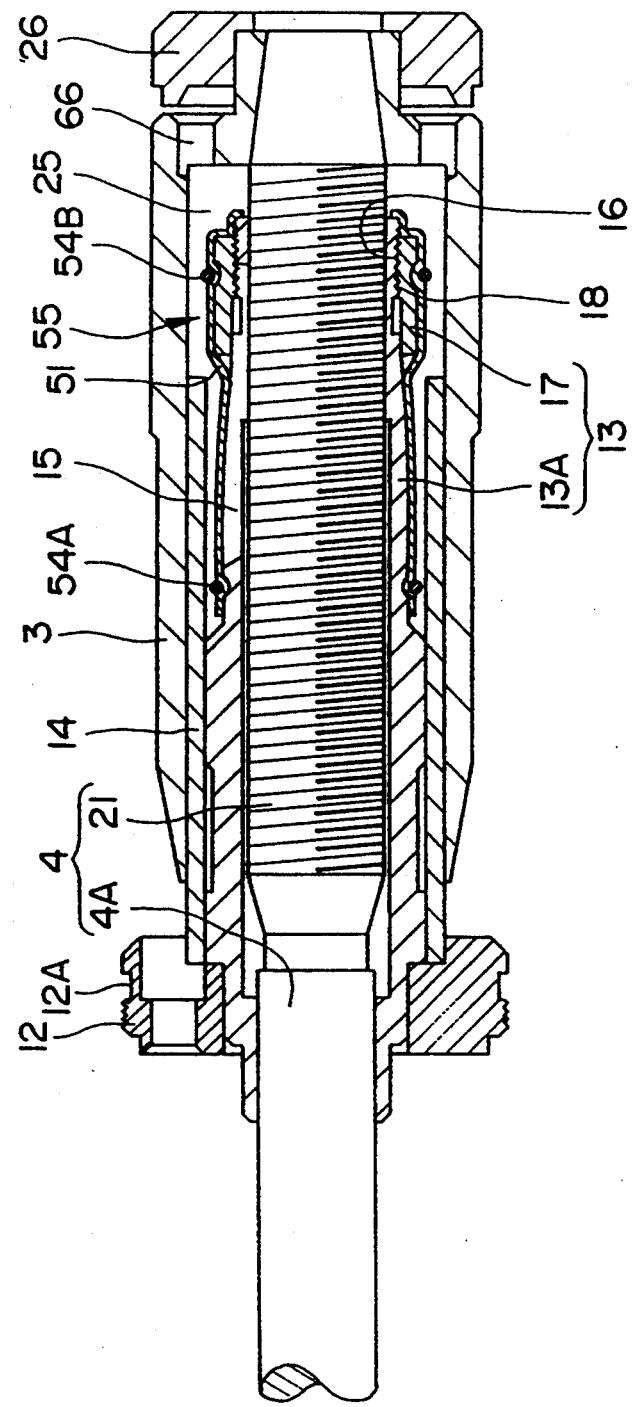
FIG. 13 is a view, corresponding to FIG. 8, of the second embodiment illustrating a different mounting state of a covering means.

Furthermore, as shown in FIG. 13, in the second embodiment, when a tapered nut 17 is completely screwed into a sleeve main body 13A to expose the end of male threads 18 of the sleeve main body 13A, it may employ such a structure that a tube member 51 covers recesses 15, male threads 18 and a tapered nut 17 of the sleeve main body 13A, and the sealing tape 56 can be saved in this structure.

Description will now be made to a third embodiment according to the present invention with reference to FIG. 14. In this third embodiment, same or similar parts or portions as those in the second embodiment carry the same reference numerals, for which descriptions will be omitted or simplified.

The third embodiment is basically identical with the second embodiment excepting for the difference in the constitution of the close bonding means.

Figure 14:
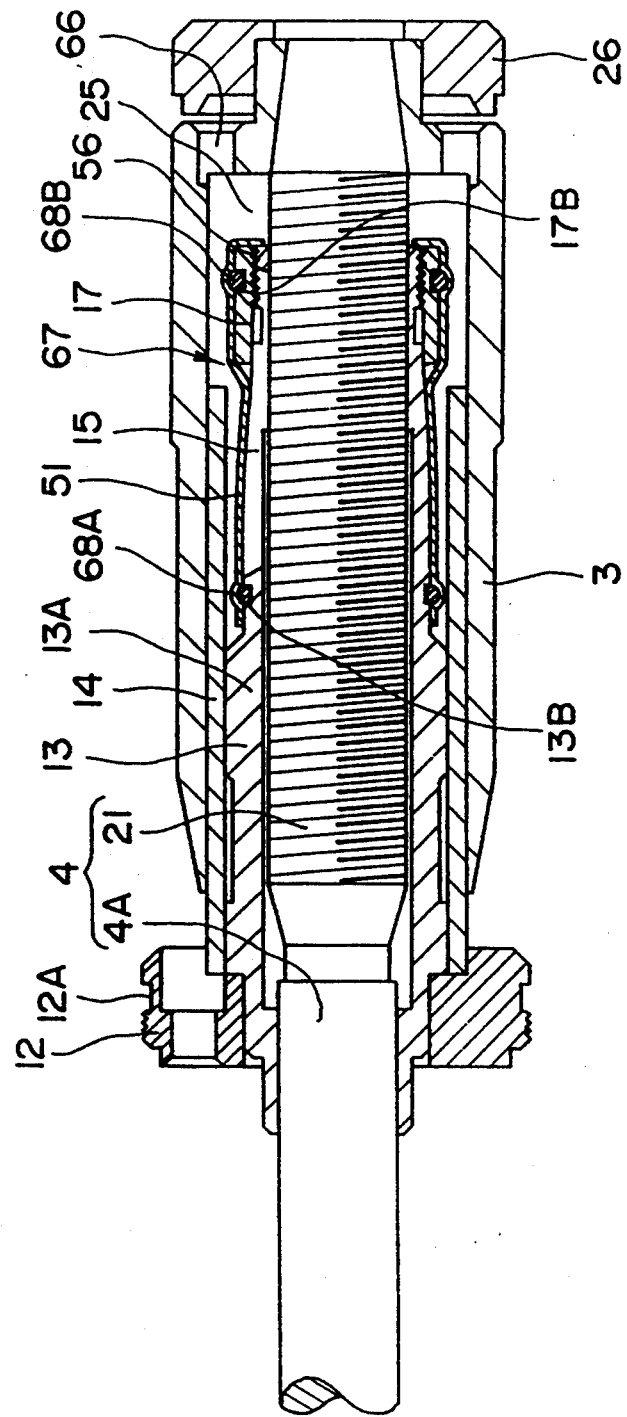
FIG. 14 is a view, corresponding to FIG. 8, illustrating a principal portion of a linear displacement measuring apparatus in a third embodiment according to the present invention.

In FIG. 14 showing a principal portion of the third embodiment, a covering means 67 comprises the tube member 51, an elastic sealing member 68A made of an O-ring inter-posed between one end of the tube member 51 and a sleeve main body 13A, and an elastic sealing member 68B made of an O-ring interposed between the other end of the tube member 51 and a tapered nut 17. The elastic sealing member 68A is fitted in a recess 13B formed to the sleeve main body 13A. The elastic sealing member 68B is fitted in a recess 17B formed to the tapered nut 17.

In the third embodiment, since the elastic sealing members 68A and 68B are interposed as the close bonding means between both ends of the tube member 51 and the inner sleeve 17, the elastic sealing members 68A and 68B crushed by the tube member 51 can provide waterproofness and, therefore, intrusion of a liquid between the inner sleeve 17 and the screw shaft 21 can be prevented reliably.

Description will now be made to a fourth embodiment according to the present invention with reference to FIG. 15 and FIG. 16. In the fourth embodiment, same or similar parts or portions as those in the second embodiment carry the same reference numerals, for which explanations will be omitted or simplified.

The fourth embodiment is basically identical with the second embodiment except for the difference in the constitution of the covering means.

Figure 15:
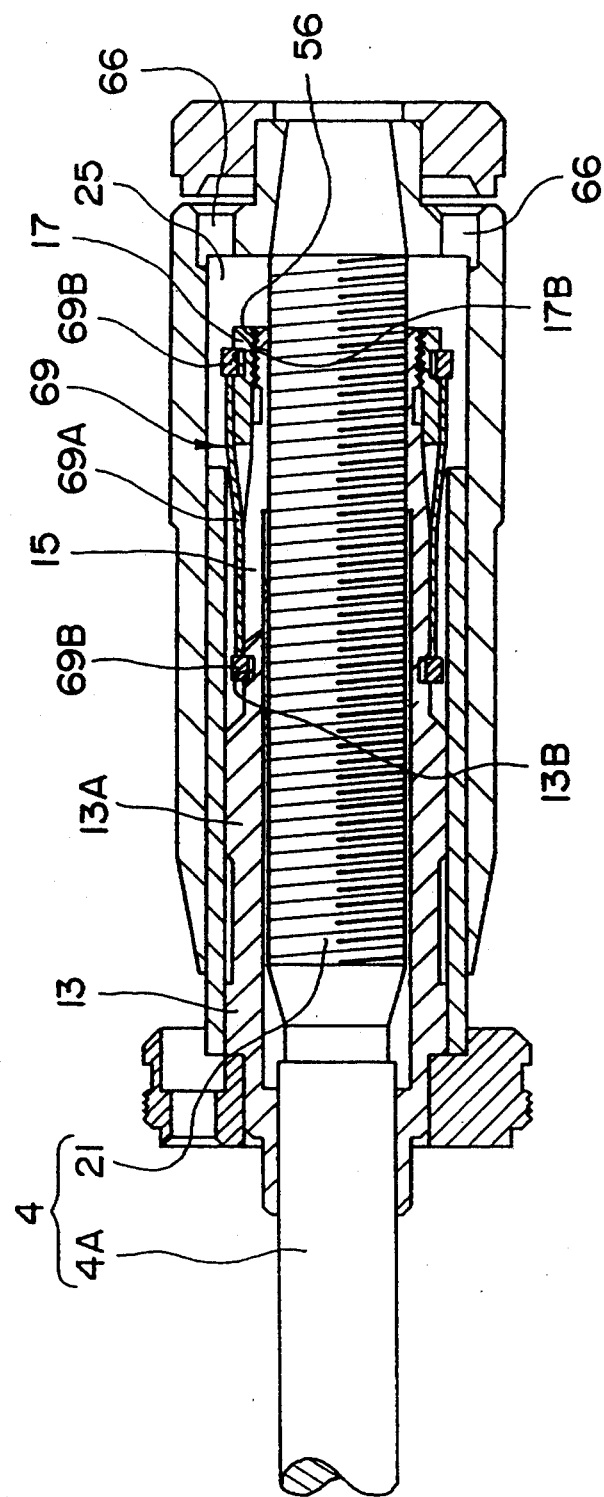
FIG. 15 is a view corresponding to FIG. 8, illustrating a principal portion of a linear displacement measuring apparatus in a forth embodiment according to the present invention.

In FIG. 15 illustrating a principal portion of the fourth embodiment, a covering means 69 comprises a tube member made of an elastic material such as rubber for tightly closing recesses 15 of an inner sleeve 13. The tube member 69 as the covering means comprises a tube main body 69A, and ring-shaped engagements 69B disposed on both sides of the tube member 69A and fitted in a sealed state to the recess 13B of the sleeve main body 13A and the recess 17B of the tapered nut 17 respectively. The thickness of the ring-shaped engagement 69B is made larger than the tube main body 69A. Further, the tube main body 69A is slackened so as to be deformable.

In the fourth embodiment having the foregoing constitution, when the spindle 3 moves forwardly, a pressure in a space S between the inner sleeve 13 and the screw shaft 21 is increased but the tube member 69 inflates to absorb the pressure change. When the spindle 3 moves backwardly, the pressure in the space S between the inner sleeve 13 and the screw shaft 21 is lowered but the tube member 69 deflates to absorb the pressure change.

Accordingly, in the fourth embodiment, since the recesses 15 of the inner sleeve 13 are intimately closed by the tube member 69 made of the elastic material such as rubber, if the pressure in the space S between the inner sleeve 13 and the screw shaft 21 should change by forward/backward movement of the spindle 3, the pressure change is absorbed by the tube member 69. Accordingly, even if volume should change in the chamber 25 by the axial movement of the thimble 3, no pumping action is caused thereby enabling to prevent the liquid from intruding to a space between the inner sleeve 13 and the screw shaft 21 and to the inside of the measuring apparatus main body 50 in continuous therewith.

In the fourth embodiment, as shown in FIG. 16, the tube member 70 made of the elastic material may be of a cylindrical shape having an engaging edge 70A formed at one end for covering the end face of the tapered nut 17. In this case, the elastic sealing members 68A, 68B may be interposed between the tube member 70 and the recess 13B of the sleeve main body 13A and the recess 178 of the tapered nut 17.

The present invention is not restricted only to the embodiments described above but various modifications are possible within the gist of the present invention, which should not be excluded out of the scope of the present invention.

For instance, although the linear displacement measuring apparatus has been described as a micrometer, the linear displacement measuring apparatus may also be a micrometer head, an inner diameter measuring apparatus, an outer diameter measuring apparatus or the like, providing that the apparatus has a structure in which the a spindle 3 is retractably disposed to the measuring apparatus main body 50, and the detector 44 for detecting a linear moving amount of the spindle is disposed to the inside of the measuring apparatus main body 50.

Further, the apparatus may have a structure not including the tapered nut 17 to the inner sleeve 18. The tapered nut 17 may be present or not so long as the apparatus has a structure in which the recesses 15 formed to the inner sleeve 13 and in communication with the detector 44 are covered with the tube member 61, 69 or 70.

As has been described above according to the present invention, erroneous operation of electric circuits which would otherwise make measurement impossible or cause measuring errors can be prevented by preventing the liquid from intruding to the inside of the measuring apparatus main body.

What is claimed is:

1. A linear displacement measuring apparatus comprising:
    a hollow measuring apparatus main body having a cavity formed therein, a first aperture and a second aperture which open into said cavity and a hollow sleeve at the first aperture in registry therewith;
    a spindle movably engaged with said measuring apparatus main body through said first and second apertures comprising a spindle main body having a first end disposed within said cavity and a second end extending outwardly from said second aperture so as to be positioned for contact with an object to be measured upon movement of said spindle into and out of said measuring apparatus main body and a screw shaft at said second end of said spindle main body and disposed within said hollow sleeve in threaded engagement therewith to facilitate said movement of said spindle relative to said measuring apparatus main body;
    a detector disposed within said cavity for detecting a linear moving amount of said spindle resulting from said movement thereof;
    path means for defining a first liquid intruding path extending into said cavity of said measuring apparatus main body to said detector, said path means including means defining an opening adjacent said sleeve; and
    a water proofing mechanism for preventing a liquid from intruding into said cavity through said liquid intruding path and comprising a covering means for sealingly covering said sleeve proximate said opening of said liquid intruding path to thereby block access to said opening.

2. A linear displacement measuring apparatus as defined in claim 1, wherein said path means defines a second liquid intruding path and an opening proximate said second aperture and said water-proofing mechanism further comprises sealing means in contact with the spindle main body and disposed on the measuring apparatus main body for blocking access to said opening of the second liquid intruding path.

3. A linear displacement measuring apparatus as defined in claim 1, wherein the measuring apparatus main body has a thimble for covering the screw shaft and the water-proof mechanism includes pressure control means for controlling a pressure in a space between said thimble and said screw shaft to a level equal with an external atmospheric pressure.

4. A linear displacement measuring apparatus as defined in claim 3, wherein the pressure control means comprises at least one opening formed in the thimble.

5. A linear displacement measuring apparatus as defined in claim 1, wherein the covering means comprises a tube member that covers recesses formed in an end of said sleeve to which said screw shaft is threadedly engaged, said recesses additionally defining said opening to said first liquid intruding path.

6. A linear displacement measuring apparatus as defined in claim 5, wherein the sleeve comprises a sleeve main body and a clamping member for clamping said sleeve main body.

7. A linear displacement measuring apparatus in claim 5, wherein close bonding means for intimately bonding both ends of the tube member to said sleeve is disposed about said tube member.

8. A linear displacement measuring apparatus as defined in claim 5, wherein the tube member is made of a thermosetting shrinkable material.

9. A linear displacement measuring apparatus as defined in claim 5, wherein the tube member is made of an elastic material.

10. A linear displacement measuring apparatus as defined in claim 7, wherein the close bonding means is an adhesive for adhering both ends of the tube member with the sleeve.

11. A linear displacement measuring apparatus as defined in claim 7, wherein the close bonding means is an elastic ring for pressing the outer circumference of the tube member to the sleeve.

12. A linear displacement measuring apparatus as defined in claim 7, wherein the close bonding means is an elastic sealing material interposed between the end of the tube member and the sleeve.

13. A linear displacement measuring apparatus as defined in claim 7, wherein the tube member comprises a tube main body and ring-like engagements each disposed on both ends of the tube main body, in which the thickness of the ring-like engagement is larger than that of the tube main body.

14. A linear displacement measuring apparatus as defined in claim 6, wherein a spacer is interposed between the sleeve main body and the clamping member for preventing the liquid from intruding into a space between the screw shaft and the sleeve.

15. A linear displacement measuring apparatus as defined in claim 4, wherein an opening end of the opening faces a corner of a chamber formed with a space between the screw shaft and the thimble.

* * * * *